Jan. 14, 1936.   D. T. WHITLOCK   2,027,800
MARINE FENDER
Filed Jan. 8, 1934
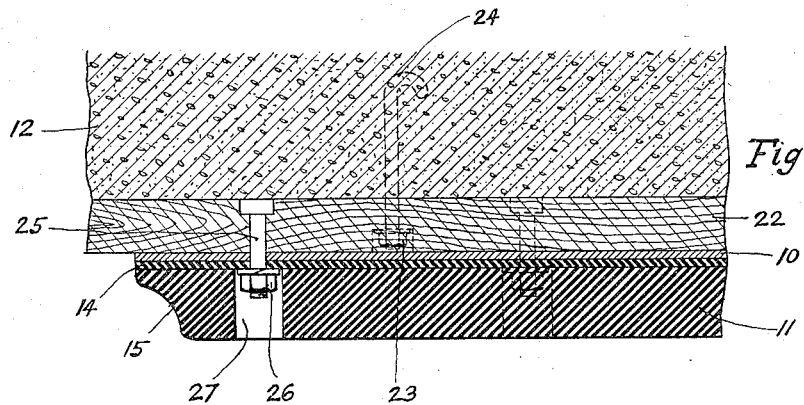
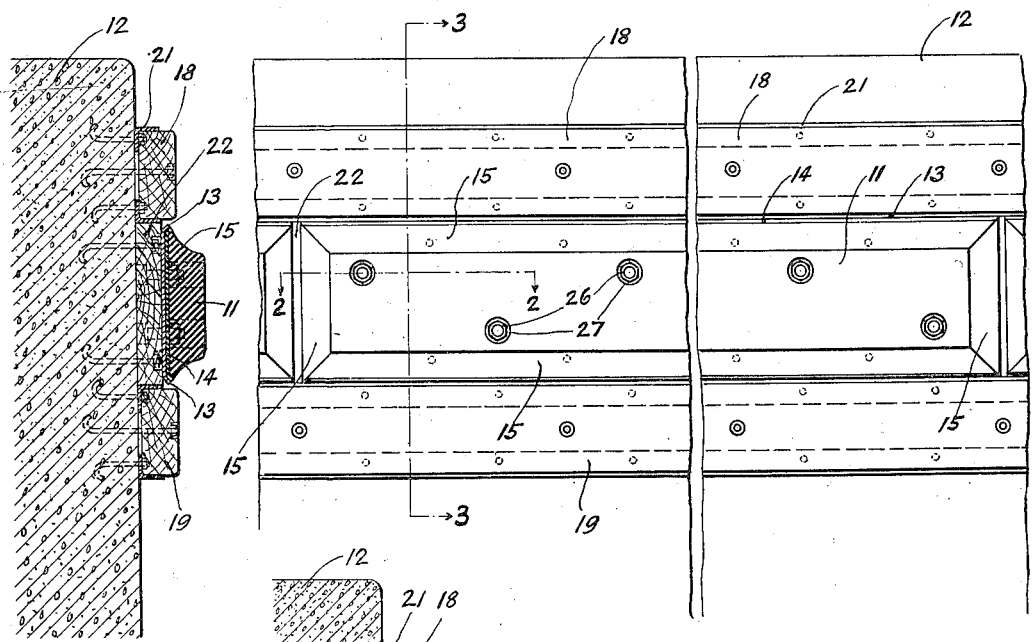
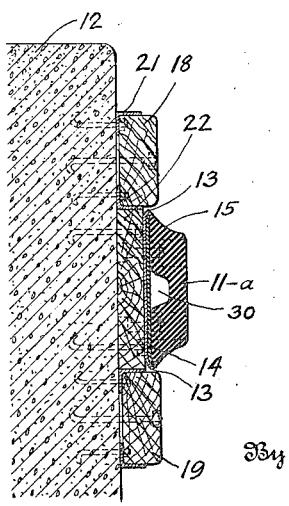
Inventor
DANA T. WHITLOCK
By
Attorney Patented Jan. 14, 1936

2,027,800

UNITED STATES PATENT OFFICE 2,027,800

MARINE FENDER

Dana T. Whitlock, Lakewood, Ohio

Application January 8, 1934, Serial No. 705,742

3 Claims. (Cl. 61—48)

This invention relates to improvements in marine fenders, and it refers more particularly to fenders which are intended for use in protecting the sides of a ship from injury caused by contact with a pier or the like.

Quite frequently the side plates or other parts of ships are damaged by contact with a pier while the ship is made fast thereto or as it is being warped into or out of dock, such experiences being met particularly in conjunction with rigid piers such as those of reinforced concrete construction. The repairs necessitated by such damage are costly both in labor and in idleness of the ship out of service. The foregoing and other objections are overcome by this invention which, in its broader aspects, contemplates the provision of a fender formed of resilient material which is so proportioned and located as to provide adequate protection for the ship when it contacts to the pier. More specifically, the invention provides a fender which is formed of a relatively long and narrow body of rubber, of substantial thickness, which is permanently secured to the side of the pier or similar structure, whereby in the event of contact the rubber will bear the brunt of the force and, being resilient, will absorb the same.

One of the objects of the invention is to provide a ship fender which is capable of functioning as above stated and which will be of simple construction, conducive to economical manufacture, and strong and durable in service.

The foregoing and other objects, features and advantages of the invention will be readily appreciated from the following description in connection with the accompanying drawing, wherein one form of the invention has been shown by way of illustration, and wherein:

Fig. 1 is a fragmentary side elevation of a pier equipped with a fender in accordance with the invention;

Fig. 2 is a fragmentary longitudinal sectional view taken substantially on the line II—II of Fig. 1; and Fig. 3 is a vertical transverse sectional view taken on the line III—III of Fig. 1.

Fig. 4 is a view similar to Fig. 3 but showing a modified form of the invention.

The novel fender comprises a metallic base plate 10 carrying a substantial body of resilient vulcanized rubber 11 and provided with suitable means for fastening the same to a pier on the like indicated at 12. Preferably, the metallic base plate 10 is relatively long and narrow and has its longitudinal edges offset into flanges 13, as best shown in Fig. 3. A thin intermediate layer 14 of hard rubber is preferably employed to effect a permanent union between the resilient body 11 and the metallic base plate 10, said layer of hard rubber being secured to the metallic base plate by vulcanization and having similarly secured to its outer surface the softer resilient rubber 11. Of course, other means may be employed for effecting the desired bond between the resilient rubber and the base plate. The marginal edges of the resilient rubber body 11 may preferably be chamfered or beveled as indicated at 15, whereby to give the fender a better finished appearance and at the same time to facilitate the lateral deflection of the rubber when under compression without tending to tear it away from its union with the metallic base plate.

Various ways and means may be employed for securing the rubber fender to the side of the pier. Such means are shown in the drawing as comprising a pair of wooden sills 18 and 19 which are spaced apart a distance slightly greater than the width of the base plate 10. These sills 18 and 19 are received between suitable channels or angle bars 21 which are permanently anchored to the side of the pier 12. A third wooden sill 22 is disposed between the sills 18 and 19, this sill 22 being of less thickness than the first two, and being detachably secured to the pier by nuts 23 and anchor bolts 24. The inner face of the base plate 10 rests against this sill 22 and is clamped in place by means of bolts 25 and cooperating nuts 26, said bolts being anchored in the sill 22 and the nuts 25 being disposed in sockets 27 suitably provided in the rubber body 11. It is to be noted that the outer surface of the rubber body 11 extends outwardly a substantial amount beyond the surfaces of the sills 18 and 19, whereby the rubber will be in position to contact with the side plates of the ship, yet it is to a certain extent protected by the sills which are respectively mounted above and below it.

A modification shown in Fig. 4 is substantially like the embodiment already described except that the rubber body 11a is cored out or otherwise recessed at 30, giving more cushioning effect with a saving in material. There might be only a single recess 30 extending longitudinally in the rubber body or there might be a plurality of separate recesses, as desired.

From the foregoing it will be evident that the presence of the fender will prevent a ship from coming in direct contact with the pier on which the fender is mounted, and that by reason of the resiliency of the material, the shocks incident to making contact will be absorbed, thus relieving the side plates of the ship from injurious strains. The parts are securely yet detachably held in place by relatively simple fastening means so that they can be easily replaced as they become excessively worn. It is to be understood that, while reference has been made to a concrete pier, the invention is not necessarily limited to such use, but may in fact be applied with equal advantage to other structures such as break-waters, canal locks and the like. Furthermore, the invention is susceptible of modification in the details of construction and arrangement of parts and the right is herein reserved to make such changes as fall within the scope of the appended claims without departing from the spirit of the invention.

Having thus described my invention, what I claim is:

1. In a marine fender, in combination, a pair of longitudinally extending wooden sills spaced apart and parallel with each other, and a relatively long and narrow block of resilient material mounted between said sills, the outer surface of said resilient material extending outwardly beyond the surfaces of said sills.

2. In combination with a pier, a marine fender assembly comprising a pair of relatively spaced parallel wooden sills secured longitudinally at the side of the pier, and cushioning means disposed between said sills, said cushioning means comprising a metallic base plate, and a substantial body of rubber secured thereto by vulcanization, said body of rubber extending outwardly from the pier and beyond the outer faces of the wooden sills.

3. In combination with a pier, a marine fender assembly comprising a pair of relatively spaced parallel rigid members extending longitudinally and secured to the side of the pier, a substantial body of rubber disposed between said rigid members and extending outwardly from the pier and beyond the outer edges of said rigid members. Said body of rubber providing cushioning means capable of resisting substantial shocks and forces, and means for securing the body of rubber in such position.

DANA T. WHITLOCK.